United States Patent [19]

Tattersall

[11] 4,135,595

[45] Jan. 23, 1979

[54] GAS-CUSHION VEHICLES

[75] Inventor: Edward G. Tattersall, Southampton, England

[73] Assignee: Hovermarine Transport Limited, Hampshire, England

[21] Appl. No.: 745,048

[22] Filed: Nov. 26, 1976

[30] Foreign Application Priority Data

Nov. 28, 1975 [GB] United Kingdom ............... 48910/75

[51] Int. Cl.² ............................................. B60V 1/18
[52] U.S. Cl. .................................... 180/117; 180/120
[58] Field of Search ............... 180/117, 120, 124, 126, 180/116

[56] References Cited

U.S. PATENT DOCUMENTS

| 1,184,062 | 3/1960 | Tattersall | 180/116 |
| 3,042,129 | 7/1962 | Wade | 180/120 |
| 3,066,753 | 12/1962 | Hurley | 180/120 |
| 3,267,882 | 8/1966 | Rapson | 180/124 X |
| 3,318,406 | 5/1967 | Scheel | 180/124 X |
| 3,800,905 | 4/1974 | Wright | 180/117 |

FOREIGN PATENT DOCUMENTS

| 784577 | 5/1968 | Canada | 180/117 |
| 1435700 | 5/1976 | United Kingdom | 180/126 |

Primary Examiner—Joseph F. Peters, Jr.
Assistant Examiner—Terrance L. Siemens
Attorney, Agent, or Firm—Holman & Stern

[57] ABSTRACT

A sidewall gas-cushion vehicle is provided with a panel movable in the bottom of the vehicle body in response to changes in cushion pressure whereby the cushion volume is increased as cushion pressure tends to increase, and vice-versa. Panel movement is controllable so as to vary the degree of response to changes in cushion pressure, and upward movement of the panel is retarded by dash-pot devices.

7 Claims, 3 Drawing Figures

GAS-CUSHION VEHICLES

BACKGROUND TO THE INVENTION

This invention relates to gas-cushion vehicles, that is to say, to vehicles for travelling over a surface and which, in operation, are supported above that surface, at least in part, by a cushion of pressurised gas, for example, air, formed and contained between the vehicle body and the surface.

When a gas-cushion vehicle travels over an undulating surface such as rough water or ground, it experiences changes in volume and thereby changes in pressure of the vehicle-supporting cushion, which changes result in the application of undesirable heave forces to the vehicle.

SUMMARY OF THE INVENTION

According to the present invention, a gas-cushion vehicle is provided with means responsive to changes in cushion pressure whereby the cushion volume is increased as cushion pressure tends to increase, and vice-versa.

The said means are preferably adjustable so as to vary the degree of response to changes in cushion pressure.

The invention is particularly suitable in connection with "sidewall" gas-cushion vehicles. That is to say, gas-cushion vehicles for travelling over the surface of water, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal.

However, the invention may also be applied to other types of gas-cushion vehicles, for example, as described and claimed in our British Pat. No. 1,184,062.

BRIEF DESCRIPTION OF THE DRAWINGS

An embodiment of the invention will now be described by way of example only, with reference to the accompanying drawings, wherein.

DESCRIPTION OF THE PREFERRED EMBODIMENT

Figure 1:
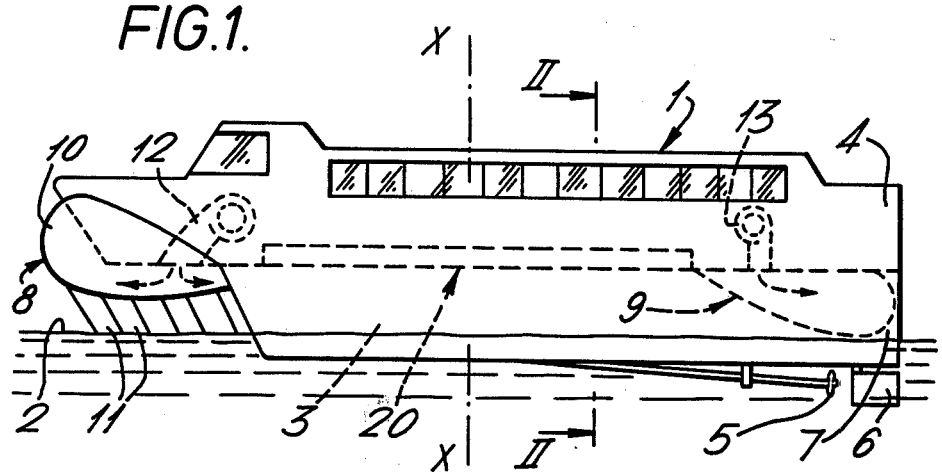
FIG. 1 is a side view of a side-wall gas-cushion vehicle.
Figure 2:
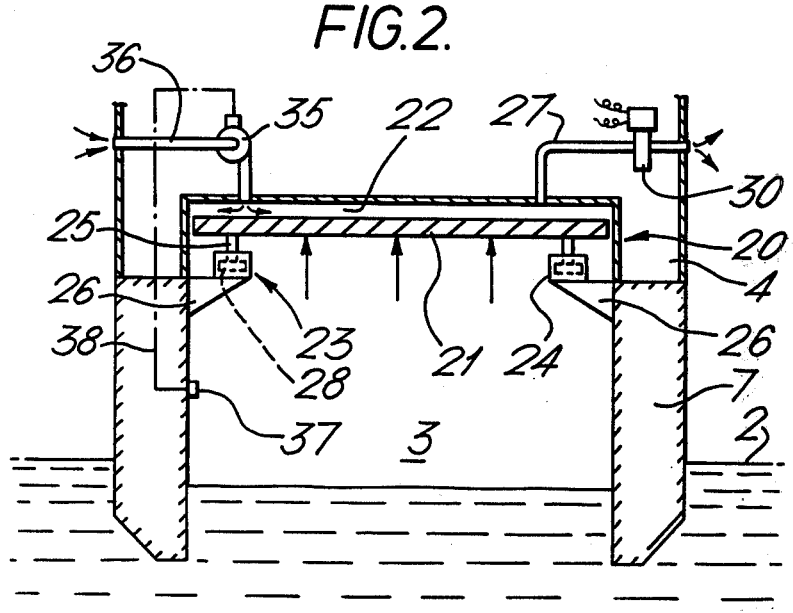
FIG. 2 is the lower part of a section, to an enlarged scale, taken on the lines II — II of FIG. 1

With reference to FIGS. 1 and 2, a side-wall gas-cushion vehicle 1 is shown travelling over the surface 2 of water, supported by a cushion 3 of pressurised air formed and contained between the vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a water-screw propeller 5 and a rudder 6.

The front, or bow end of the cushion 3 is contained by a flexible skirt 8 and the rear, or stern end thereof by a flexible skirt 9. The skirts 8, 9, which are of hollow, inflatable form, and constructed from rubberised fabric, extend laterally between (and in the case of the skirt 8, beyond as well) the front and rear ends of the sidewalls 7. The skirts 8, 9, are demountably attached to the vehicle body 4 and depend therefrom. The flexible skirt 8 is in light contact with the water surface 2. The inflation and tension forces set up in the flexible skirt 9 ensure that it is maintained clear of but in close proximity to the surface 2.

The front flexible skirt 8 is of two-stage form and comprises an inflated bag 10 from which depend a succession of independently-deflectable flexible wall or skirt members 11 of the form disclosed by British patent specification No. 1,043,351. Air forming the vehicle-supporting cushion 3 is provided by a pair of centrifugal fans 12 disposed side by side. Air from the fans 12 passes through the flexible skirt 8 to inflate it before entering the space occupied by the cushion 3. The rear flexible skirt 9 is inflated by air supplied by a centrifugal fan 13. The fans 12 and fan 13 form separate means for supplying air to the space occupied by the vehicle-supporting cushion 3 and the skirt 9 respectively.

As best shown in FIG. 2, the vehicle 1 is provided with means, indicated generally by reference numeral 20, responsive to changes in cushion pressure whereby the volume of the cushion 3 is increased as cushion pressure tends to increase, and vice-versa.

The means 20 comprise a movable panel 21 disposed, with small side clearance, in a rectangular recess 22 defined by, i.e. formed in, the bottom surface of the vehicle body 4 and extending over the major part of said bottom surface. The panel 21 is supported along its sides by two substantially parallel rows of supports 23 comprising dash-pots 24 with upwardly-extending dash-pot piston rods 25 attached to the bottom surface of the panel 21 so as to support the latter. The dash-pots 24 are disposed on brackets 26 attached to the inner surfaces of the sidewalls 7. That part of the recess 22 above the panel 21 is connected to atmosphere by way of a vent line 27. In practice, the recess 22 may be substantially deeper than illustrated and correspondingly more vertical movement of the panel 21 may be provided for.

Damping springs (not shown) are disposed beneath the dash-pot pistons 28 so as to retard upward movement of the pistons. The pistons 28 have the usual pressure-equalising means. (For example bleed holes through the pistons 28).

In operation, as the vehicle 1 travels over the water surface 2, should it meet rough water whereby the wave size is such that increases and decreases occur in cushion volume, resulting in corresponding increases and decreases in cushion pressure, the large area panel 21 will respond to said pressure changes by moving up and down within the recess 22.

This bodily movement of the panel 21, which movement is damped by the dash-pot pistons 28 and associated springs, avoids the application of undesirable heave forces to the vehicle, such forces being accepted by the panel itself.

The vent line 27 avoids undue build-up in air pressure above the panel 21.

The stiffness of the damping springs may be made variable by using fluid actuators operable remotely by the pilot of the vehicle 1, and adjusting the actuators so as to vary the degree of response of the means 20 to changes in cushion volume and pressure.

Figure 3:
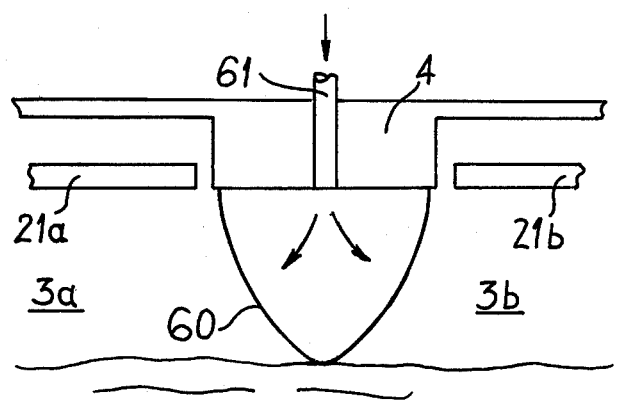
FIG. 3 is a fragmentary front view in medial section.

The invention may also be used to restrict the application of undesirable pitch forces to the vehicle 1. With reference to FIG. 3, this could be done by fitting a transverse wall 60 of inflatable form between the sidewalls 7 and in or adjacent the plane X—X so as to divide the cushion 3 into separate front and rear cushion compartments 3a, 3b and dividing the panel 21 in two parts with one part (21a) in one cushion compartment and the other part (21b) in the other cushion compartment, each panel part being movable relative to the other. The wall 60 is inflated by way of a duct 61 connected to fan 13. Thus, as the front of the vehicle rises and falls in rough water, the panel parts 21a, 21b will respond to the changes in cushion compartment volumes and pressure, so that the vehicle is not subjected to unwanted pitch forces.

The invention need not be confined to conventional "side-wall" gas-cushion vehicles. It may also be applied, for example, to gas-cushion vehicles of the form disclosed by our British Patent No. 1,184,062 to which reference should be made. With reference to FIGS. 6–10 of said patent, the fixed membraneous barrier illustrated therein may be made bodily movable in substantially the same way as the panel 21, FIG. 1, of the present specification. The invention may also be applied to gas-cushion vehicles other than "side-wall" vehicles.

With reference to FIG. 2, the vent line 27 may have a remote-controlled and motor-operated flow control valve 30 fitted therein so as to control the outflow of leakage air and thus contribute damping characteristics to the system.

With further reference to FIG. 2, pressurised air may be supplied, in this case by a compressor 35 drawing in atmospheric air by way of an inlet line 36, to that part of the recess 22 above the panel 21. The output of the compressor 35, which output is variable, is automatically controlled by a device 37 sensitive to changes in cushion pressure and connected to the compressor by an electrical signal line 38. This damping arrangement provides a further control of forces governing movement of the panel 21 and of the vehicle 1.

I claim:

1. A gas-cushion vehicle provided with means responsive to changes in cushion pressure whereby the cushion volume is increased as cushion pressure tends to increase, and vice-versa, said means comprising a panel movable in a recess defined by the bottom surface of the vehicle body, and means for avoiding pressure build-ups in said recess.

2. A vehicle as claimed in claim 1, wherein the panel is provided with means for retarding upward movement of the panel.

3. A vehicle as claimed in claim 1, wherein the panel is provided with dash-pot means for retarding upward movement of the panel.

4. A vehicle as claimed in claim 1, having recess vent means and means for controlling outflow through the vent means.

5. A vehicle as claimed in claim 1, having means for increasing pressure in said recess.

6. A vehicle as claimed in claim 5, wherein the means for increasing pressure in said recess is automatically controlled by means sensitive to changes in cushion pressure.

7. A vehicle as claimed in claim 1, provided with a transverse wall dividing the space occupied by the cushion into two cushion compartments, said panel being divided into two parts, with one part panel to each cushion compartment.

* * * * *